(12) United States Patent
Wang et al.

(10) Patent No.: US 11,113,724 B1
(45) Date of Patent: *Sep. 7, 2021

(54) CONTENT SELECTION ASSOCIATED WITH WEBVIEW BROWSERS

(71) Applicant: Google LLC, Mountain View, CA (US)

(72) Inventors: Gang Wang, Jersey City, NJ (US); Yong Yao, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,883

(22) Filed: Sep. 9, 2019

Related U.S. Application Data

(63) Continuation of application No. 14/600,895, filed on Jan. 20, 2015, now Pat. No. 10,453,092.

(51) Int. Cl.
    *G06Q 30/00*     (2012.01)
    *G06Q 30/02*     (2012.01)

(52) U.S. Cl.
    CPC ..... *G06Q 30/0255* (2013.01); *G06Q 30/0275* (2013.01); *G06Q 30/0277* (2013.01)

(58) Field of Classification Search
    CPC .......... G06Q 30/0255; G06Q 30/0275; G06C 30/0277
See application file for complete search history.

(56) References Cited

U.S. PATENT DOCUMENTS

| | | |
|---|---|---|
| 9,380,332 B1 | 6/2016 | Mills |
| 10,453,092 B1 | 10/2019 | Wang et al. |
| 2006/0282327 A1* | 12/2006 | Neal ............ H04N 21/222 705/14.53 |
| 2009/0012852 A1 | 1/2009 | O'Kelley et al. |
| 2009/0228357 A1 | 9/2009 | Turakhia |
| 2010/0088358 A1 | 4/2010 | Schunemann |
| 2010/0100445 A1 | 4/2010 | Flood |
| 2011/0125593 A1 | 5/2011 | Wright et al. |
| 2013/0198011 A1 | 8/2013 | Corner et al. |
| 2016/0344831 A1 | 11/2016 | Schneider |

* cited by examiner

*Primary Examiner* — Yehdega Retta
(74) *Attorney, Agent, or Firm* — Fish & Richardson P.C.

(57) ABSTRACT

Methods, systems, and apparatus include computer programs encoded on a computer-readable storage medium for delivering content. A method includes: identifying a webview; providing a script for execution when the webview is initiated, the script causing a device associated with the webview to retrieve a unique identifier associated with the device, encode the unique identifier, construct a URL that includes an advertising system domain and the encoded unique identifier, and pass the encoded unique identifier to the advertising system; passing a cookie for the advertising domain back to the webview for inclusion in the cookie space of the webview; storing information related to interactions of a user of the device when accessing content through different browsers or applications so as to unify the cookie spaces of the different browsers; identifying a request for content as being associated with the device; and using the information to determine content for delivery.

20 Claims, 6 Drawing Sheets

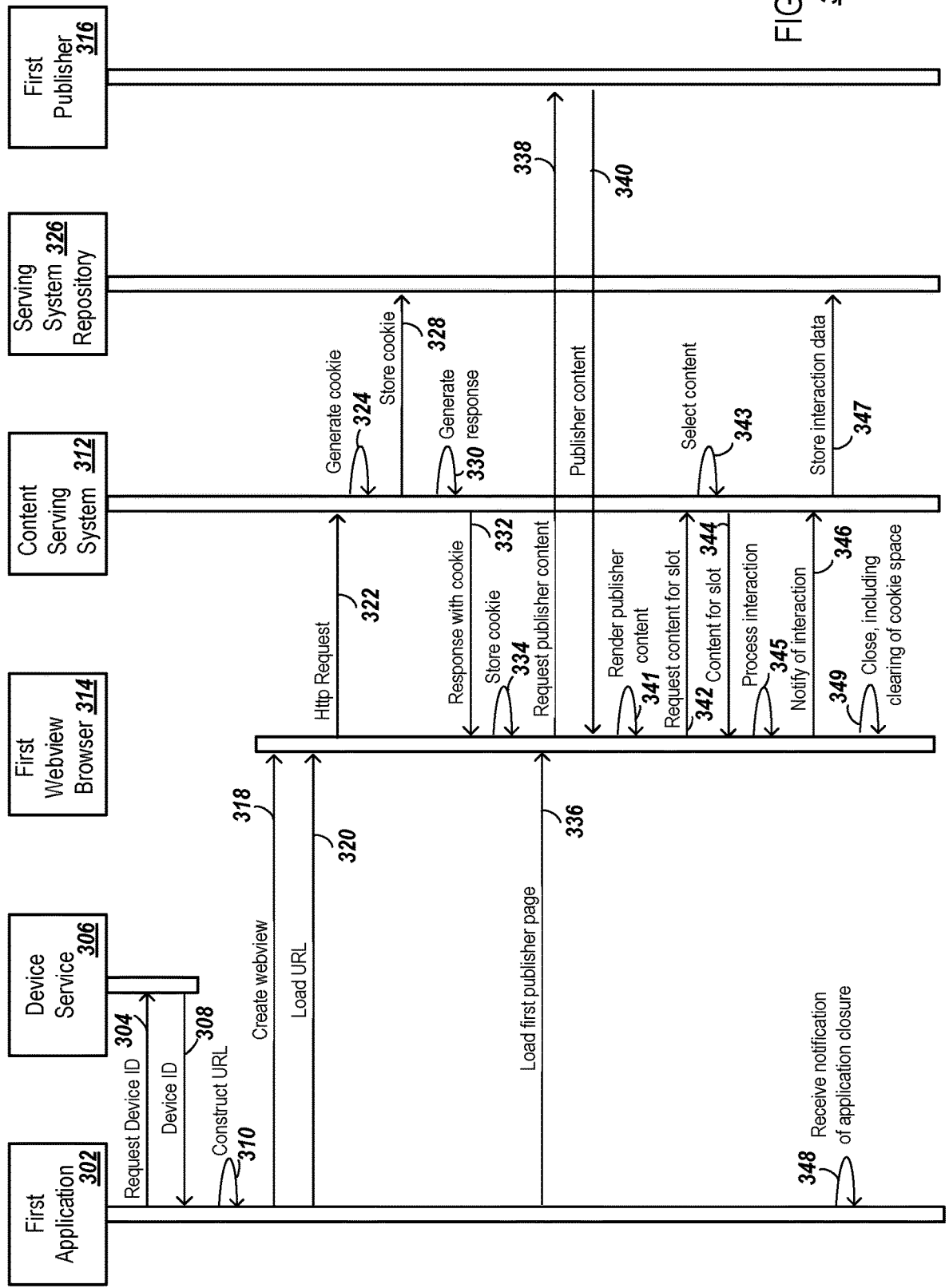

350

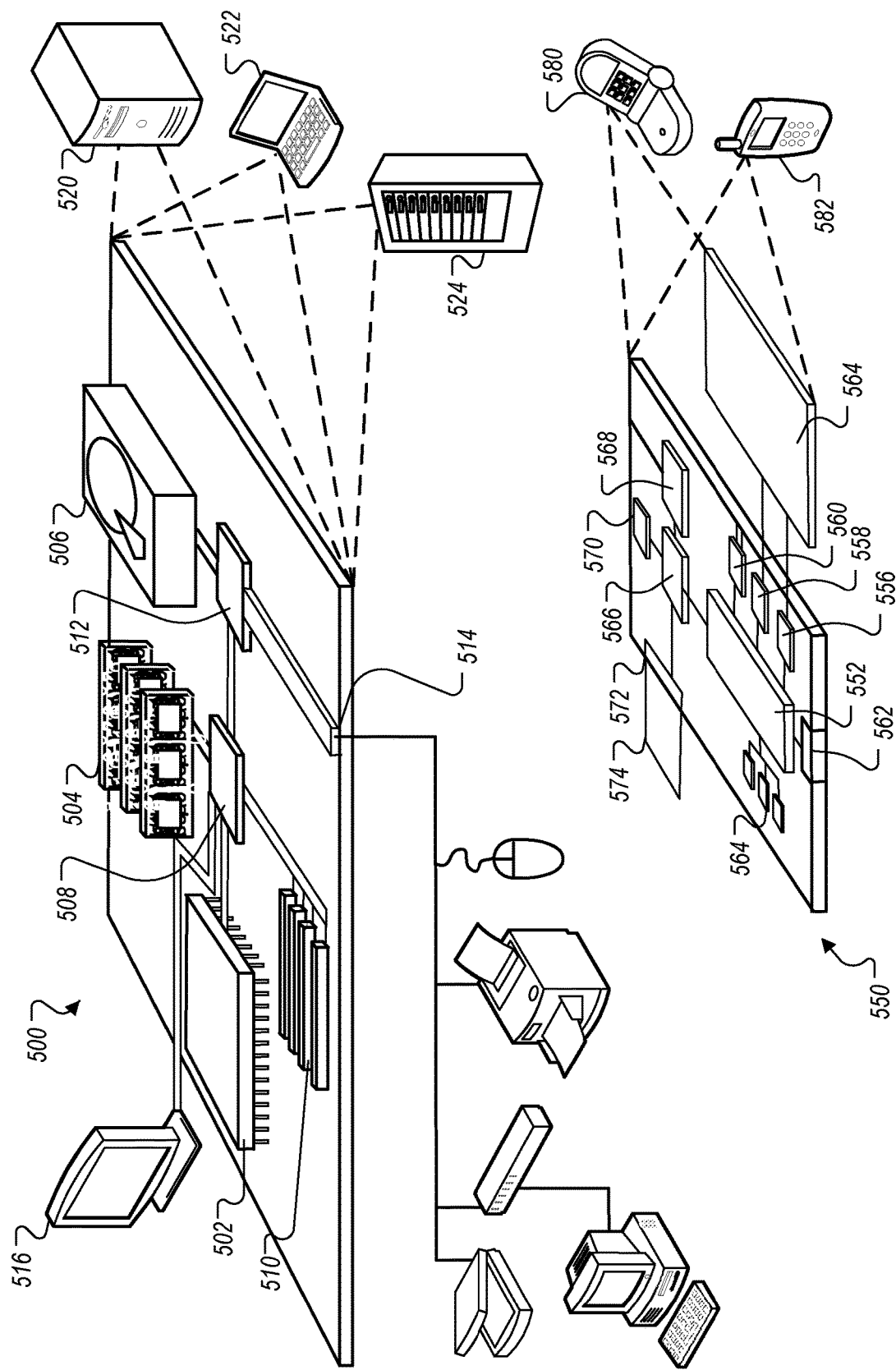

CONTENT SELECTION ASSOCIATED WITH WEBVIEW BROWSERS

CROSS-REFERENCE TO RELATED APPLICATIONS

This application is a continuation application of, and claims priority to, U.S. patent application Ser. No. 14/600,895, titled "CONTENT SELECTION ASSOCIATED WITH WEBVIEW BROWSERS," filed on Jan. 20, 2015. The disclosure of the foregoing application is incorporated herein by reference in its entirety for all purposes.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for expanding a cookie space associated with a webview. A method includes: identifying a webview, the webview being an embedded browser and associated with a cookie space and a path definition that defines a publisher website that is to be loaded by the webview; providing a script for execution when the webview is initiated, the script causing a resident device associated with the webview to retrieve a unique identifier associated with the resident device, encode the unique identifier, construct a URL that includes an advertising domain of an advertising system and the encoded unique identifier, and pass the encoded unique identifier to the advertising system; responsive to receipt of the encoded unique identifier by the advertising system, passing a cookie for the advertising domain back to the webview for inclusion in the cookie space of the webview; storing, in a repository of the advertising system and in association with the unique identifier, information related to interactions of a user of the resident device when accessing content on the web through different browsers or applications including information related to interactions with two or more of the webview; a second, different webview on the resident device; a browser on the resident device; or an application on the resident device so as to unify the cookie spaces of the different browsers; identifying a request for content as being associated with the resident device; and using the information to determine content for delivery responsive to the request.

In general, another aspect of the subject matter described in this specification can be implemented in computer program products. A computer program product is tangibly embodied in a computer-readable storage device and comprises instructions. The instructions, when executed by a processor, cause the processor to: identify a webview, the webview being an embedded browser and associated with a cookie space and a path definition that defines a publisher website that is to be loaded by the webview; provide a script for execution when the webview is initiated, the script causing a resident device associated with the webview to retrieve a unique identifier associated with the resident device, encode the unique identifier, construct a URL that includes an advertising domain of an advertising system and the encoded unique identifier, and pass the encoded unique identifier to the advertising system; responsive to receipt of the encoded unique identifier by the advertising system, pass a cookie for the advertising domain back to the webview for inclusion in the cookie space of the webview; store, in a repository of the advertising system and in association with the unique identifier, information related to interactions of a user of the resident device when accessing content on the web through different browsers or applications including information related to interactions with two or more of the webview; a second, different webview on the resident device; a browser on the resident device; or an application on the resident device so as to unify the cookie spaces of the different browsers; identify a request for content as being associated with the resident device; and use the information to determine content for delivery responsive to the request.

In general, another aspect of the subject matter described in this specification can be implemented in systems. A system includes one or more processors and one or more memory elements including instructions. The instructions, when executed, cause the one or more processors to: identify a webview, the webview being an embedded browser and associated with a cookie space and a path definition that defines a publisher website that is to be loaded by the webview; provide a script for execution when the webview is initiated, the script causing a resident device associated with the webview to retrieve a unique identifier associated with the resident device, encode the unique identifier, construct a URL that includes an advertising domain of an advertising system and the encoded unique identifier, and pass the encoded unique identifier to the advertising system; responsive to receipt of the encoded unique identifier by the advertising system, pass a cookie for the advertising domain back to the webview for inclusion in the cookie space of the webview; store, in a repository of the advertising system and in association with the unique identifier, information related to interactions of a user of the resident device when accessing content on the web through different browsers or applications including information related to interactions with two or more of the webview; a second, different webview on the resident device; a browser on the resident device; or an application on the resident device so as to unify the cookie spaces of the different browsers; identify a request for content as being associated with the resident device; and use the information to determine content for delivery responsive to the request.

These and other implementations can each optionally include one or more of the following features. The script can be configured to make a first call to the advertising system, the first call including the encoded unique identifier and an address for the advertising domain, and responsive to the first call, receive the cookie from the advertising system for inclusion in the cookie space associated with the webview. The advertising system can be configured to, responsive to receipt of the first call, provide a response and drop the cookie of the advertising system in the cookie space associated with the webview. The response can include a tracking pixel. The response can be an empty response which includes no renderable content. The script can be configured to make a second, different call after receipt of the cookie of the advertising system, the second call to the publisher web site to retrieve content from the publisher website for inclusion in the webview. The publisher website can include one or more slots for inclusion of advertising content provided by the advertising system. The cookie associated with the advertising system can be received from the resident device in association with processing an ad call that is included in the content that is retrieved from the publisher website. The received cookie can be used to locate other cookies associated with other browsers of the resident device and associated information for each cookie related to user interactions of the user of the resident device. The located cookies can be used to determine relevant content for inclusion in the ad slot responsive to the ad call. The script can include a call to an operating system of the resident device to retrieve the unique identifier for the device. The unique identifier can be selected from the group comprising serial number, IMEI, MEID, ICCID, device identifier, IDFA, or advertising system identifier. The URL can include contextual information including one or more of an application identifier, information related to the webview or other contextual information, or location information associated with the resident device. The contextual information can be used to select content to serve responsive to the received request. Passing can include providing a redirect to the publisher website that redirects an underlying ad request to the publisher website from the advertising system. Passing the cookie for the advertising domain can include calculating a cookie based on the received unique identifier. Passing the cookie for the advertising domain can include generating a pseudo random cookie, and storing the generated pseudo random cookie indexed by the unique identifier. The script can be provided to an application that includes the webview.

Particular implementations may realize none, one or more of the following advantages. Content customized for a user can be presented in a webview. Information related to interactions by the user with content presented in various webviews can be used for selecting content subsequently presented to the user, despite a cookie space associated with the webview possibly being cleared upon closure of the webview and the cookie spaces of the various webviews being separate on the user's device.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A and 3B are sequence diagrams of an example process for expanding a cookie space associated with a webview.

FIG. 5 is a block diagram of computing devices that may be used to implement the systems and methods described in this document, as either a client or as a server or plurality of servers.

Like reference numbers and designations in the various drawings indicate like elements.

DETAILED DESCRIPTION

A web browser can be used to display content available through the Internet. An application on a device can as well be adapted to display web content, such as by including an embedded web browser in the application. A webview is an application (e.g., a mobile application) that can display web content using for example an embedded browser. A conventional webview application has its own cookie space which in some cases is not persistent—e.g., the cookie space can be cleared when the application ends, the application is re-installed, etc. This lack of persistency of the cookie space of the webview application poses challenges for presenting user-customized content in the webview. In some implementations proposed herein, the webview application (or a script associated with the application) can be configured to provide a unique identifier for a hosting mobile device and to receive a cookie associated with the domain of a content serving (e.g., advertising) system. The received cookie can be associated with user interaction information and the user interaction information can be used to select content to present to the user in the webview application (hereinafter, just webview), in a second, different webview, in a browser, or in another application, to name a few examples.

For situations in which the systems discussed here collect information about users, or may make use of information about users, the users may be provided with an opportunity to control whether programs or features collect user information (e.g., information about a user's social network, social actions or activities, profession, demographics, a user's preferences, or a user's current location), or to control whether and/or how to receive content from a content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
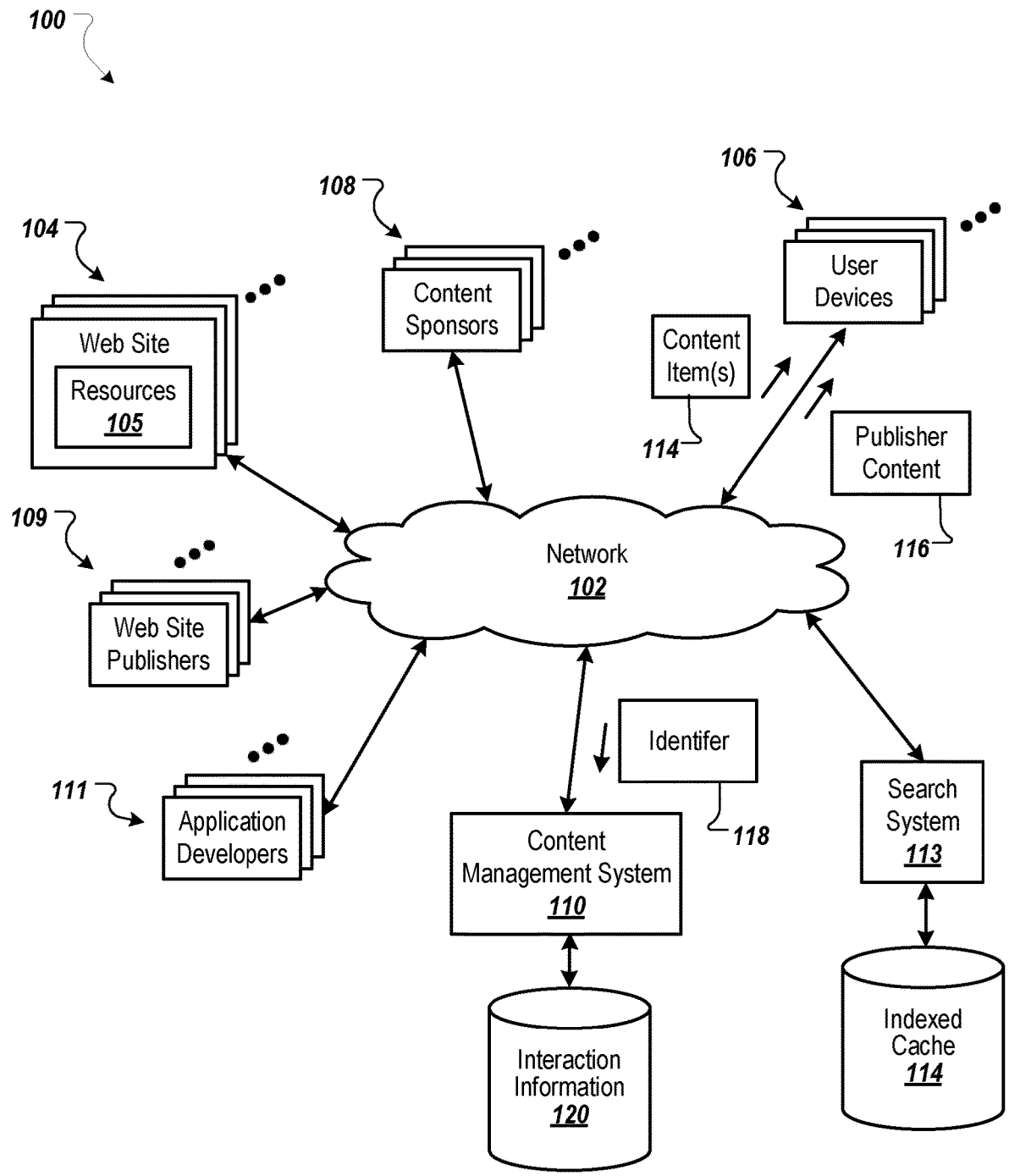
FIG. 1 is a block diagram of an example environment for providing content to a user device.

FIG. 1 is a block diagram of an example environment 100 for providing content to a user device. The example environment 100 includes a network 102, such as a local area network (LAN), a wide area network (WAN), the Internet, or a combination thereof. The network 102 connects websites 104, user devices 106, content sponsors 108, publishers 109, a content management system 110, application developers 111, and a search system 113. The example environment 100 may include many thousands of websites 104, user devices 106, and content sponsors 108. The content management system 110 may be used for selecting and providing content in response to requests for content. The content sponsors 108 can be, for example, advertisers. Other types of content sponsors are possible.

A content sponsor 108 can create a content campaign associated with one or more content items using tools provided by the content management system 110. For example, the content management system 110 can provide one or more account management user interfaces for creating and managing content campaigns. The account management user interfaces can be made available to the content sponsor 108, for example, either through an online interface provided by the content management system 110 or as an account management software application installed and executed locally at a content sponsor's client device.

A content sponsor 108 can, using the account management user interfaces, provide campaign parameters which define a content campaign. The content campaign can be created and activated for the content sponsor 108 according to the parameters specified by the content sponsor 108. Campaign parameters can include, for example, a campaign name, a preferred content network for placing content, a budget for the campaign, start and end dates for the campaign, a schedule for content placements, content (e.g., creatives), bids, and selection criteria. Selection criteria can include, for example, a language, one or more geographical locations or websites, and one or more selection terms.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, applications, and news feed sources, to name only a few. The resources 105 can include content, such as words, phrases, videos, images and sounds, that may include embedded information (such as meta-information hyperlinks) and/or embedded instructions (such as scripts). A content sponsor 108 can act as a content publisher and can be associated with a website 104, and with one or more resources 105 (e.g., web pages, applications, other resources). Resources can be provided by the publishers 109 or by the application developers 111, for example.

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. User devices 106 can also submit search queries to the search system 113 over the network 102. In response to a search query, the search system 113 can, for example, access an indexed cache 114 to identify resources 105 that are relevant to the search query. The search system 113 identifies the resources 105 in the form of search results and returns the search results to the user devices 106 in search results pages. A search result is data generated by the search system 113 that identifies a resource 105 that is responsive to a particular search query, and can include a link to the resource 105. An example search result can include a web page title, a snippet of text or a portion of an image extracted from the web page, and the URL (Unified Resource Location) of the web page.

A search result or a resource 105 can be sent responsive to a request received from a user device 106. The search result or resource 105 can be sent with a request for the web browser of the user device 106 to set a Hypertext Transfer Protocol (HTTP) cookie. A cookie can represent, for example, a particular user device 106 and/or a particular web browser. For example, the search system 113 can include a server that replies to a search query by sending a search result in an HTTP response. Such an HTTP response can include instructions (e.g., a set cookie instruction) requesting the browser to store a cookie for the site hosted by the server.

In some implementations, each cookie can include content which specifies an initialization time that indicates a time at which the cookie was initially set on the particular user device 106. If the browser supports cookies and cookies are enabled, subsequent page requests to the same server can include the cookie for that server. Because HTTP is a stateless protocol, the use of cookies can allow an external service, such as the search system 113, the content management system 110 or other system, to track particular actions and status of a user over multiple sessions. The cookie can store a variety of data, and in some implementations, a unique or semi-unique identifier. In some implementations, the identifier can be anonymized so that the privacy of users is protected. For example, in some implementations, semi-unique identifiers are associated with users, but actual identifying information of the users is not stored in a cookie. Additionally, in some implementations any identified user interactions can be generalized rather than associated with a particular user. Encryption and obfuscation techniques can also be used to protect the privacy of users.

The data representing the resource 105 or the search results can also include data specifying a portion of the resource 105 or search results or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot.

When a resource 105 or search results are requested by a user device 106, the content management system 110 may receive a request for content to be provided with the resource 105 or search results. The request for content can include characteristics of one or more slots or impressions that are defined for the requested resource 105 or search results. For example, a reference (e.g., URL) to the resource 105 or search results for which the slot is defined, a size of the slot, and/or media types that are available for presentation in the slot can be provided to the content management system 110. Similarly, keywords associated with a requested resource 105 or a search query for which search results are requested can also be provided to the content management system 110 to facilitate identification of content that is relevant to the resource 105 or search query. An identifier (e.g., cookie) associated with the user device 106 can be received with the request for content.

Based, for example, on data included in the request for content, the content management system 110 can select content items that are eligible to be provided in response to the request. One or more selected content items 114 can be provided to the user device 106 in association with providing an associated resource 105 or search results. The provided content item(s) can be presented on the user device 106, in one or more respective slots.

In some implementations, the content management system 110 can select content items based at least in part on results of an auction. For example, content sponsors 108 can provide bids specifying amounts that the content sponsors 108 are respectively willing to pay for presentation of their content items. In turn, an auction can be performed and the slots can be allocated to content sponsors 108 according, among other things, to their bids and/or the relevance of a content item to content presented on a page hosting the slot or a request that is received for the content item. For example, when a slot is being allocated in an auction, the slot can be allocated to the content sponsor 108 that provided the highest bid or a highest auction score (e.g., a score that is computed as a function of a bid and/or a quality measure). When multiple slots are allocated in a single auction, the slots can be allocated to a set of bidders that provided the highest bids or have the highest auction scores.

An application provided by an application developer 111 can include one or more embedded browsers. A webview that is implemented as or that includes the embedded browser can be used, for example, to present a resource 105 (e.g., web page) associated with a publisher 109 to a requesting user device 106. In some implementations, the application developer 111 can be associated with the publisher 109. For example, the application developer 111 can develop a mobile application for the publisher 109 for purposes of presenting publisher content 116 on the user device 106. The publisher 109 may desire to present the content of the publisher web page in the application without needing to modify the publisher web page or without requiring the user to open a generic browser and navigate to a resource associated with the publisher 109. A webview can facilitate such presentation.

A conventional webview can have a temporary cookie space, meaning that the cookie space for the webview can be cleared when the application (and correspondingly, the embedded browser) closes. To overcome a lack of cookie persistency in the webview, the application (or a script provided to the application) can be configured to retrieve a unique identifier associated with the user device 106, encode the unique identifier, construct a URL that includes a domain associated with the content management system 110, and pass the encoded unique identifier (e.g., identifier 118) to the content management system 110. Details of this process are described in further detail below.

The content management system 110 can, in response to receiving the encoded unique identifier, pass a cookie for the domain associated with the content management system 110 back to the webview for inclusion in the cookie space of the webview. The application (or a script provided to the application) can be configured to make a second call after receipt of the cookie to the publisher website to retrieve content from the publisher website for inclusion in the webview (without modifying the publisher content). Subsequent calls to the content management system 110 from the webview can include the cookie. Subsequent calls can include, for example, requests for content for content slots included in the publisher content and notifications of user interactions with presented content.

The content management system 110 can pass a same cookie to the user device 106 in response to receiving the encoded unique identifier from other webviews running on the same user device 106, such as from a second instance of the webview in a later, different session, or from a second, different webview (e.g., included in the same or a different application). Subsequent calls to the content management system 110 from the other webviews can include the cookie.

The content management system 110 can store, in a repository 120, in association with the unique identifier, information related to interactions of a user of the user device 106 when accessing content on the web through different browsers, including information related to interactions with two or more of the webview and/or with a second, different webview. When the content management system 110 identifies a request for content as being associated with the user device 106, the content management system 110 can retrieve the interaction information and use the interaction information to determine content for delivery responsive to the request.

In some implementations, a unique identifier associated with a user device 106 can be re-set (e.g., in response to user action or some other event). The content management system 110 can receive a request with the new unique identifier and can determine that the new unique identifier corresponds to a previously stored unique identifier. The content management system 110 can associate a cookie previously associated with the previously stored unique identifier with the new unique identifier.

Figure 2:
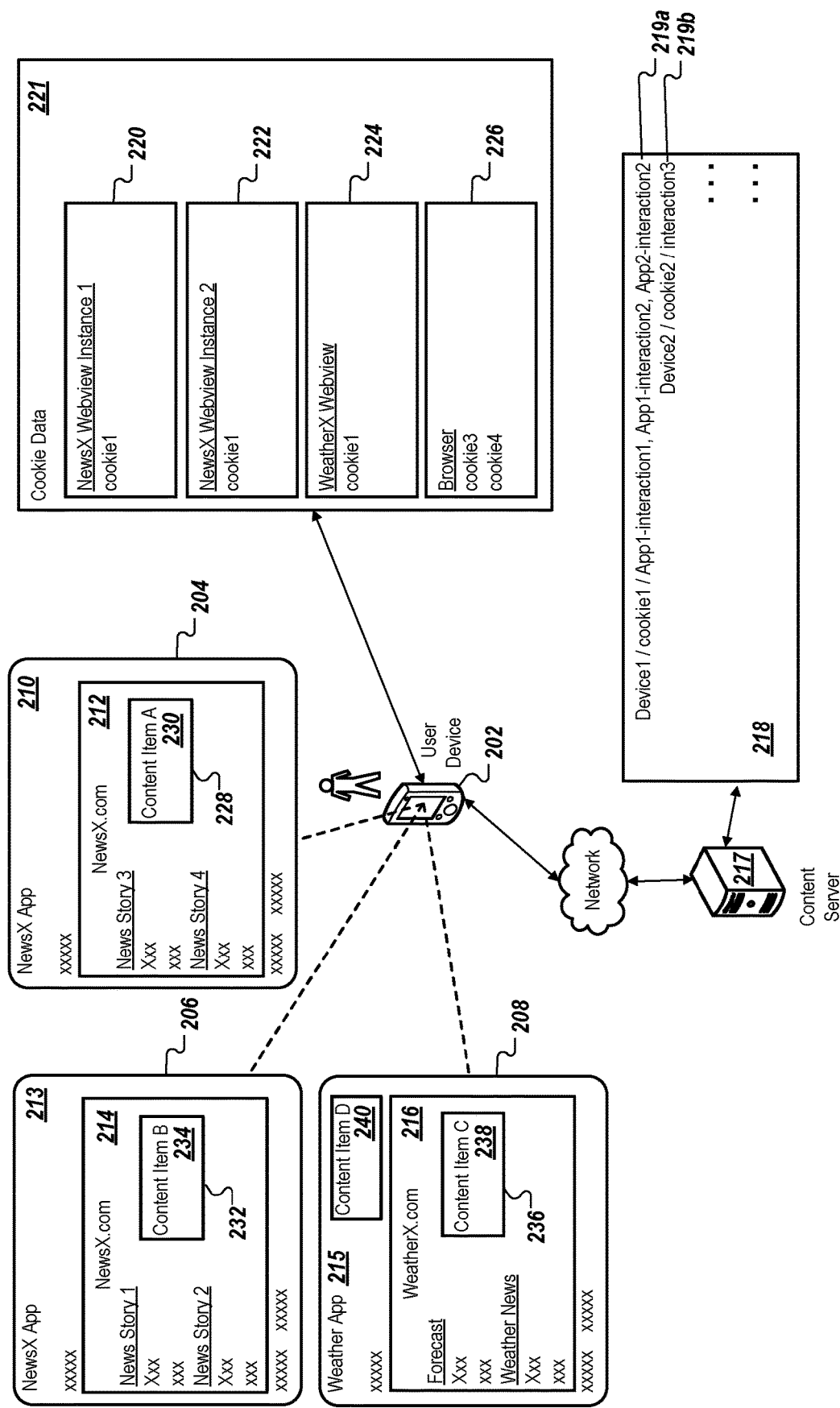
FIG. 2 is a block diagram of an example system for expanding a cookie space associated with a webview.

FIG. 2 is a block diagram of an example system 200 for expanding a cookie space associated with a webview. A user uses a user device 202 to view various user interfaces, including user interfaces 204, 206 and 208. The user interface 204 includes an application 210 which is a "NewsX" application. The application 210 includes a webview browser 212, which can be used to present content from a "NewsX.com" website in the application 210. The user interface 206 includes an application 213 which is a second instance of the NewsX application executing on the user device 202 at a time after the application 210 is closed. The application 213 includes a webview browser 214 which is a second, different instance of the webview browser 212. The user interface 208 includes a different, weather-related application 215. The application 215 includes a webview browser 216.

The application 210 sends a request to an operating system of the user device 202 to retrieve a unique identifier associated with the user device 202. The request can be initiated based on a script that is included in the application 210. In some implementations, the application 210 constructs a URL (Uniform Resource Locator) that includes the unique identifier and a domain associated with a content server 217. In some implementations, the application 210 can include other information in the URL, such as an application identifier and/or location information for the user device 202 (or other contextual information). While reference is made to constructing a URL, other forms of message are possible.

The application 210 prompts the webview browser 212 to load the URL. In response to the prompt from the application 210, the webview browser 212 sends an HTTP (HyperText Transfer Protocol) request to the content server 217. In response to the HTTP request, the content server 217 generates a cookie and includes the cookie in an HTTP response sent to the webview browser 212. The content server 217 can store the cookie, in association with the received device identifier (after the device identifier is extracted from the received URL), in a repository 218 (e.g., as illustrated by "Device1/cookie1" information included in a repository entry 219a). The repository 218 can also include information (e.g., an entry 219b) associated with other devices (e.g., other devices associated with the user of the user device 202 or with other users).

The webview browser 212 stores the cookie (e.g., "cookie1") in a cookie area 220 associated with the webview browser 212 that is included in cookie storage 221 of the user device 202. The cookie storage 221 also includes cookie areas 222 and 224 associated with the webview browsers 214 and 216, respectively, and a cookie area 226 associated with a browser (e.g., a non-webview browser) of the user device 202. A conventional webview browser can access cookies in its own cookie space but cannot access cookies in other cookie spaces. For example, in some implementations, the webview browser 212 can access the cookie space 220 but cannot access the cookie spaces 222, 224, or 226. In some implementations, the cookie spaces 220 and 222 associated with the NewsX application are in a shared cookie space.

After prompting the webview browser 212 to load the URL, the application 210 prompts the webview browser 212 to load the NewsX.com publisher page. The webview browser 212 sends a request for the publisher page to a server associated with the publisher (not shown). The publisher server provides the NewsX.com page to the user device 202 and the NewsX.com page is rendered in the webview browser 212. In this example, when rendering the NewsX.com page, the webview browser 212 encounters a content slot 228 included in the NewsX.com page.

The content slot 228 can be associated with a script which, when executed, sends a request to the content server 217 for a content item to present in the content slot 228. The content server 217 can select a content item for the content slot 228, such as based on content or metadata associated with the NewsX.com web page, contextual information included in the URL provided by the application 210, other contextual information, or other information known by the content server 217. The selected content item is provided to the webview browser 212, for presentation in the content slot 228, as illustrated by a content item 230.

The user of the user device 202 can interact with the presented content item 230 (e.g., select the content item 230), which can result in a landing page of the content item 230 being presented in the webview browser 212 (or in another browser, such as a default, e.g., non-embedded browser installed on the user device 202). The user can purchase a product or perform some other action which may be determined to be a conversion. Conversion/interaction information can be sent from the webview browser 212 to the content server 217, for storage in the repository 218. For example, the entry 219a includes "App1-interaction1" information. When the URL generated by the application 210 and provided to the webview browser 212 includes contextual information, contextual information can be stored in the repository 218, such as in association with the device identifier, the cookie provided to the webview browser 212, and/or with received interaction information (e.g., the "App1" label included in the "App1-interaction1" information can indicate that the "interaction1" interaction was associated with the "NewsX" application 210).

In some implementations, upon closure of the application 210, the cookie area 220 associated with the webview browser 212 is cleared. As mentioned, the application 213 is a second instance of the application 210 that is invoked at a time after the application 210 is closed. When the application 213 is invoked by a user, the application 213 generates (or retrieves) a URL that includes the unique identifier associated with the user device 202 and the domain associated with the content server 217 (among possibly other information). As described above in association with the actions of application 210, the application 213 prompts the webview browser 214 to load the URL. In response, the webview browser 214 sends a request to the content server 217. In response to the request from the webview browser 214 and based on the received unique identifier, the content server 217 retrieves (or regenerates) the previously generated cookie associated with the user device 202 and includes the cookie in a response sent to the webview browser 214. The webview browser 214 stores the cookie (e.g., "cookie1") in the cookie area 222.

After prompting the webview browser 214 to load the URL, the application 213 prompts the webview browser 214 to load the NewsX.com publisher page. The webview browser 214 sends a request for the publisher page to the publisher server. The publisher server provides the NewsX.com page and the NewsX.com page is rendered in the webview browser 214. When rendering the NewsX.com page, the webview browser 214 encounters a content slot 232 included in the NewsX.com page. The processing of the content slot 232 results in a request for content being sent to the content server 217.

The request for content for the content slot 232 includes the cookie included in the cookie area 222. The content server 217 can locate the entry 219a based on the received cookie. The content server 217 can select a content item for the content slot 232 based at least in part on information in or associated with the entry 219a (e.g., on information associated with prior interactions of the user with previous instances of the webview browser 214). The selected content item is provided to the webview browser 214, for presentation in the content slot 232, as illustrated by a content item 234. The user of the user device 202 can interact with the presented content item 234 and conversion/interaction information (which includes the cookie provided to the webview browser 214) can be sent from the webview browser 214 to the content server 217, for storage in the repository 218. For example, the entry 219a includes "App1-interaction2" information. Upon closure of the application 213, the cookie area 222 associated with the webview browser 214 is cleared.

Similar to processing related to the webview browsers 212 and 214, the content server 217 can send a cookie to the webview browser 216, in response to a URL being provided to the content server 217 by the webview browser 216 (e.g., in association with initiation of the underlying application). The cookie is stored in the cookie area 224 associated with the webview browser 216. When the URL includes an application identifier (e.g., "App2" corresponding to the weather application), the application identifier can be stored in or associated with the entry 219a. The application 215 can prompt the webview browser 216 to load a publisher page (e.g., "WeatherX.com") and the publisher page can be rendered in the webview browser 216, which can result in a content request being sent to the content server 217 for a content slot 236.

The content request includes the cookie provided to the webview browser 216. The content server 217 can select a content item for the content request based on information in or associated with the entry 219a (e.g., based on interactions associated with webview browsers that are different than the webview browser 216). The selected content item is provided to the webview browser 216, for presentation in the content slot 236, as illustrated by a content item 238. When the user interacts with the content item 238, interaction information can be sent to the content server 217 and stored in or associated with the entry 219*a* (e.g., the entry 219*a* includes "App2-interaction1" information).

Information in or associated with the entry 219*a* can be used to select content for other requests for content. For example, information in or associated with the entry 219*a* can be used to select a content item 240 that is presented in the application 215. The content server 217 can identify the entry 219*a*, for example, based on an application identifier or a device identifier included in the content request, and based on this identification can provide content in application 215 that relates to other content or interactions that occurred in other applications or in association with another browser.

FIG. 3A is a sequence diagram of an example process 300 for expanding a cookie space associated with a webview. A first application 302 running on a mobile device sends a request 304 to a device service 306 running on the mobile device for a device identifier associated with the mobile device. The device service 306 returns a device identifier 308 to the first application 302.

The first application 302 constructs a URL using the device identifier (310). The URL includes a domain associated with a content serving system 312.

The first application 302 creates or invokes a first webview browser 314, for displaying web content from a first publisher 316 (318). The first application 302 prompts (e.g., sends a request 320 to) the first webview browser 314 to load the URL constructed by the first application 302.

In response to the prompt (e.g., receiving the request 320), the first webview browser 314 sends an HTTP request 322 to the content serving system 312. The HTTP request 322 includes the device identifier. In response to receiving the HTTP request 322, the content serving system 312 generates a cookie using the device identifier included in the HTTP request 322 (324). The content serving system 312 stores the cookie in a repository 326 (328).

The content serving system 312 generates an HTTP response that includes the cookie (330) and sends the HTTP response to the first webview browser 314 (332). The first webview browser 314 receives the HTTP response and stores the cookie included in the HTTP response in a cookie space associated with the first webview browser 314 (334).

The first application 302 prompts (e.g., sends a request 336 to) the first webview browser 314 to load a first publisher web page associated with the first publisher 316. In response to the request 336, the first webview browser 314 sends a request 338 to the first publisher 316 for the first publisher web page. The first publisher 316 sends the first publisher web page to the first webview browser 314 (340). The first webview browser 314 renders the first publisher web page (341).

When rendering the first publisher web page, the first webview browser 314 encounters a content slot associated with the content serving system 312. The first webview browser 314 sends a request 342 for content for the slot to the content serving system 314. The request 342 includes the cookie stored by the first webview browser 314.

The content serving system 312 selects content in response to the request 342 (343). The first webview browser 314 receives the content from the content serving system 312 and renders the content (344).

Subsequent to the rendering of a content item received from the content serving system 312, the first webview browser 314 receives and processes an indication of a user interaction with the content item (345). The first webview browser 314 can, for example, execute a script provided by the content serving system 312 and included in or otherwise associated with the content item. The first webview browser 312 sends a notification 346 which includes interaction data to the content serving system 312. The notification 346 includes the cookie previously stored by the first webview browser 314.

The content serving system 312 stores the interaction data in the repository 326, in association with the cookie (347). As described in more detail below, the content serving system 312 can use the stored interaction data when selecting content for subsequent requests for content that are associated with the same mobile device.

The first application 302 receives an indication that the first application 302 is closing (348). As part of the closing of the first application 302, the first webview browser 314 is closed (349). The closing of the first webview browser 314 includes the clearing of the cookie space associated with the first webview browser 314.

Figure 3B:
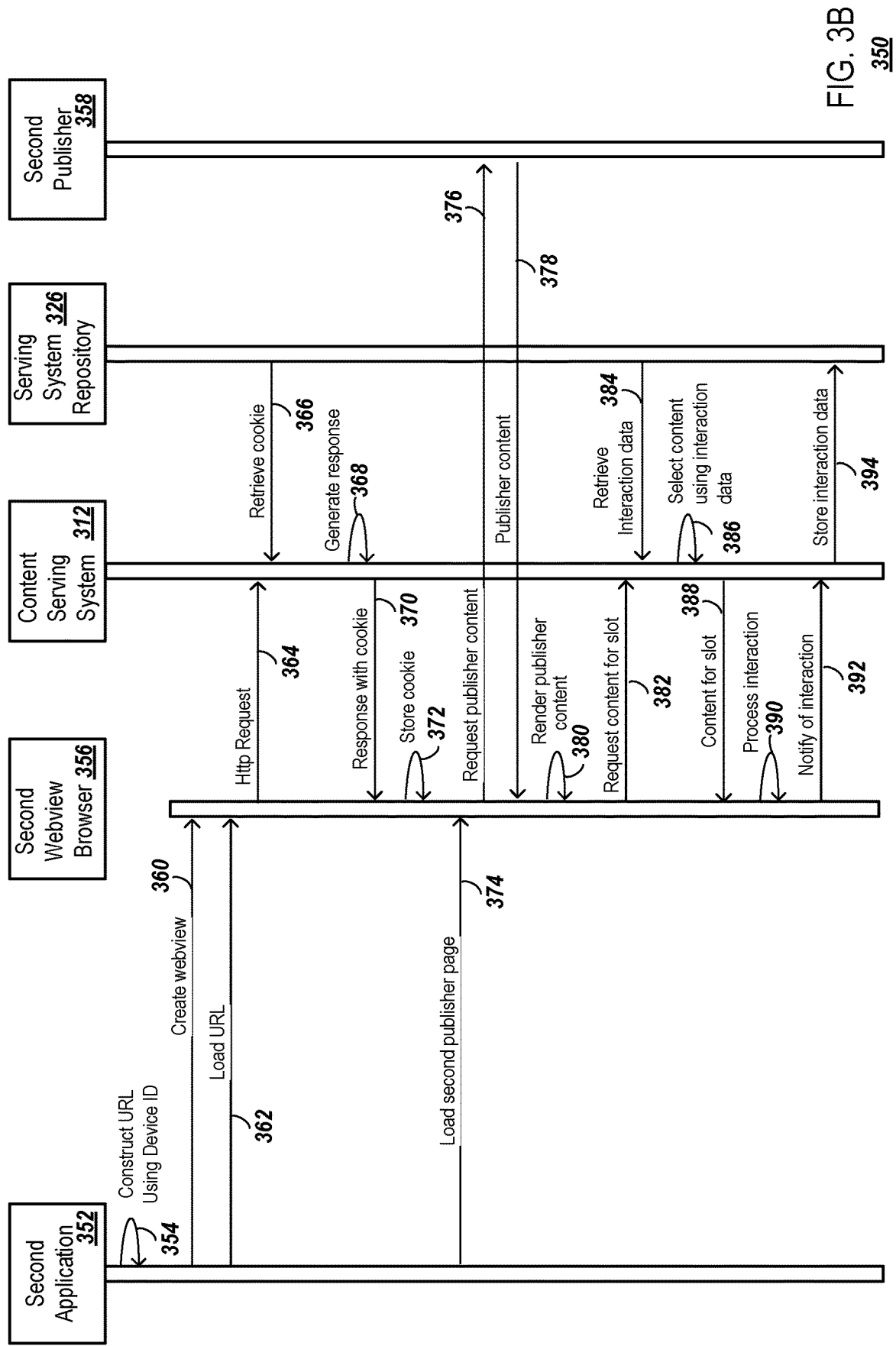

FIG. 3B is a sequence diagram illustrating a process 350 which is a continuation of the example process 300 of FIG. 3A.

Upon initiation, a second application 352 on the mobile device constructs a URL using a device identifier of the mobile device (354). The second application 352 may have previously retrieved the device identifier, for example. The second application 352 creates or invokes a second webview browser 356, for displaying web content from a second publisher 358 (360).

The second application 352 prompts (e.g., sends a request 362 to) the second webview browser 356 to load the URL constructed by the second application 352. In response to the prompt (e.g., receiving the request 362), the second webview browser 356 sends an HTTP request 364 to the content serving system 312. The HTTP request 364 includes the device identifier.

The content serving system 312 uses the device identifier to retrieve or generate a cookie associated with the device identifier that was previously stored in the repository 326 (366). The content serving system 312 generates an HTTP response that includes the retrieved/generated cookie (368) and sends the HTTP response to the second webview browser 356 (370). The second webview browser 356 receives the HTTP response and stores the cookie included in the HTTP response in a cookie space associated with the second webview browser 356 (372).

The second application 352 prompts (e.g., sends a request 374 to) the second webview browser 356 to load a second publisher web page associated with the second publisher 358. In response to the request 374, the second webview browser 356 sends a request 376 to the second publisher 358 for the second publisher web page. The second publisher 358 sends the second publisher web page to the second webview browser 356 (378). The second webview browser 356 renders the second publisher web page (380).

When rendering the second publisher web page, the second webview browser 356 encounters a content slot associated with the content serving system 312. The second webview browser 356 sends a request 382 for content for the slot to the content serving system 312. The request 382 includes the cookie stored by the second webview browser 356.

The content serving system 312 retrieves interaction data associated with the cookie included in the request 382 from the repository 326 (384). The content serving system 312 selects content in response to the request 382 using the retrieved interaction data (386). The second webview browser 356 receives the content from the content serving system 312 and renders the content (388).

Subsequent to the rendering of a content item received from the content serving system 312, the second webview browser 356 receives and processes an indication of a user interaction with the content item (390). The second webview browser 356 can, for example, execute a script provided by the content serving system 312 and included in or otherwise associated with the content item. The second webview browser 356 sends a notification 392 which includes interaction data to the content serving system 312. The notification 392 includes the cookie previously stored by the second webview browser 356. The content serving system 312 stores the interaction data in the repository 326, in association with the cookie (394).

The content serving system 312 can use the stored interaction data when selecting content for subsequent requests for content that are associated with the same mobile device. For example, a request for content can be received from the second webview browser 356 in a same session as the session in which the request 382 is sent or in a different session (e.g., a subsequent session in which a second, different instance of the second webview browser 356 is generated). As another example, the content serving system 312 can use the stored interaction data to select content in response to a subsequent request received from a second instance of the first webview browser 314. As yet another example, the content serving system 312 can use the stored interaction data to select content in response to a subsequent request received from a standalone browser (e.g., a browser that is not embedded in an application) executing on the mobile device.

Figure 4:
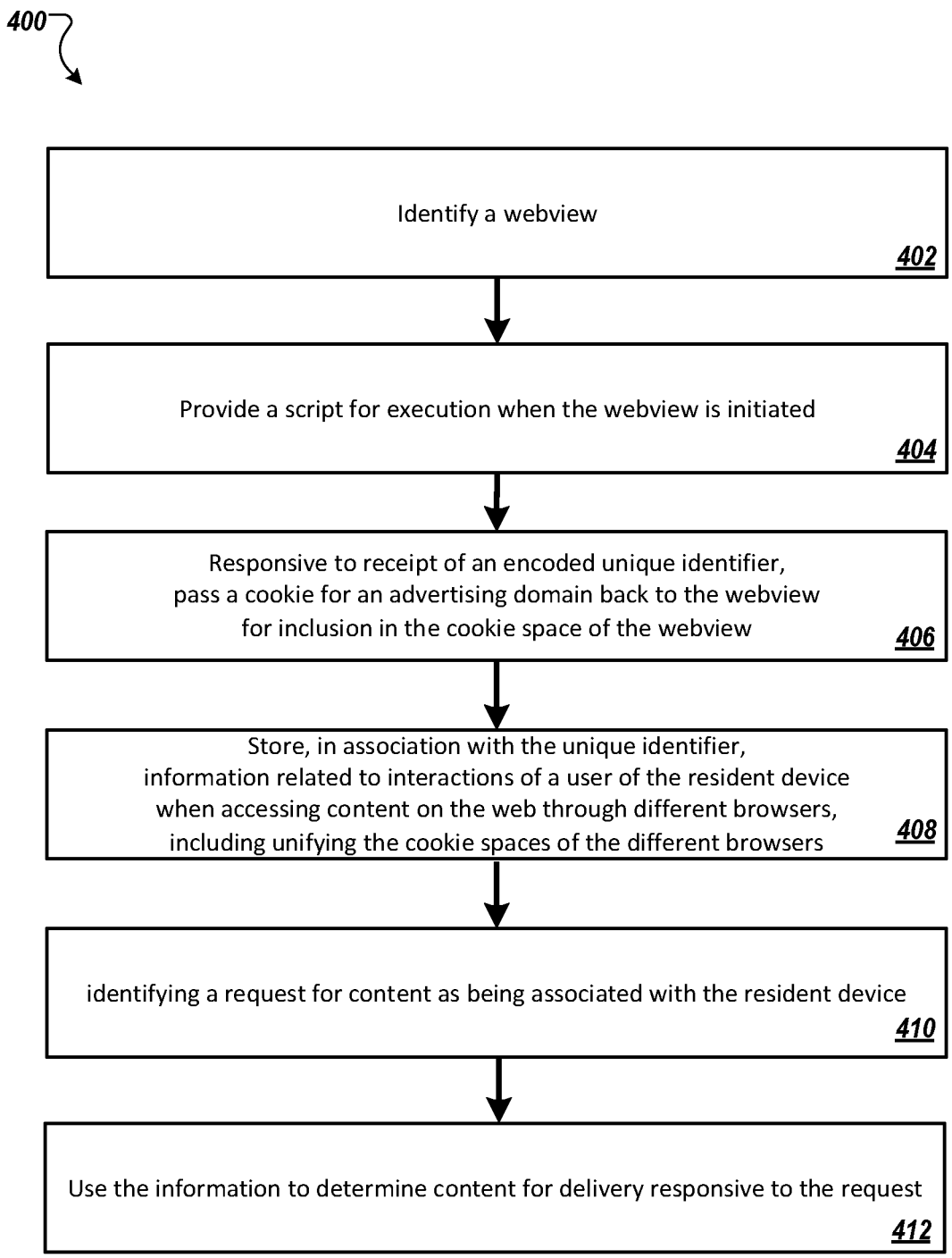
FIG. 4 is a flowchart of an example process for expanding a cookie space associated with a webview.

FIG. 4 is a flowchart of an example process 400 for expanding a cookie space associated with a webview. The process 400 can be performed, for example, by the content management system 110 described above with respect to FIG. 1 or the content server 217 described above with respect to FIG. 2.

A webview is identified (402). In some implementations, the webview is an embedded browser and is associated with a cookie space and a path definition that defines a publisher website that is to be loaded by the webview.

A script is provided for execution when the webview is initiated (404). The script causes a resident device associated with the webview to retrieve a unique identifier associated with the resident device, in some implementations, encode the unique identifier, construct a URL that includes an advertising domain of an advertising system and the encoded unique identifier, and pass the encoded unique identifier to the advertising system. The script can be configured to make a first call to the advertising system, the first call including the encoded unique identifier and an address for the advertising domain.

In some implementations, the unique identifier is encoded during transport to the advertising system, such as using the HTTPS protocol (Hyper Text Transfer Protocol Secured). In some implementations, the script is provided to and executed in an application that includes the webview. The script can include a call to an operating system, a service, or a background process of the resident device to retrieve the unique identifier for the device. The unique identifier can be, for example, a serial number, IMEI (International Mobile Station Equipment Identity), MED (Mobile Equipment Identifier), ICCID (Integrated Circuit Card ID), IDFA (Identifier for Advertising), Android™ Advertising ID, some other device identifier, or an advertising system identifier. In some implementations, the URL includes contextual information including one or more of an application identifier, information related to the webview or other contextual information, or location information associated with the resident device. In some implementations, passing includes providing a redirect to the publisher website that redirects from the advertising system to the publisher website.

Responsive to receipt of the encoded unique identifier by the advertising system, a cookie for the advertising domain is passed back to the webview for inclusion in the cookie space of the webview (406). For example, the cookie can include the encoded unique identifier. As another example, the advertising system can generate the cookie by calculating a cookie based on the received unique identifier. As yet another example, the advertising system can generate a pseudo random cookie and store the generated pseudo random cookie indexed by the unique identifier. The advertising system can, in response to receiving the encoded unique identifier (e.g., in response to the first call), generate an empty response (e.g., a 1×1 transparent tracking pixel) which includes the cookie (e.g., the cookie of the advertising system can be dropped in the cookie space associated with the webview).

Information related to interactions of a user of the resident device when accessing content on the web through different browsers or applications is stored in a repository of the advertising system and in association with the unique identifier (408). The stored information includes information related to interactions with two or more sessions of the webview, a second, different webview on the resident device, a browser on the resident device, or an application on the resident device. Storing can include unifying the cookie spaces of the different browsers, such as by associating the interaction information from each of the different browsers with the unique identifier.

A request for content as being associated with the resident device is identified (410). The request for content includes the cookie. The request for content can be for content to present in a second, different webview, a different instance of the webview (e.g., in a subsequent session), a browser (e.g., not embedded in an application) on the resident device, or an application on the resident device. As another example, the request for content can be for content to present in the webview in the current session. As yet another example, the request for content can be for content to present in a second webview in the current session (e.g., an application can include two webviews).

For example, the script can be configured to make a second, different call after receipt of the cookie of the advertising system. The second call can be a call to the publisher website to retrieve content from the publisher website for inclusion in the webview. The webview can render the retrieved publisher content. The publisher website can include one or more slots for inclusion of advertising content provided by the advertising system. The advertising system can receive, from the resident device, in association with processing, an ad call that is included in the content that is retrieved from the publisher website. The cookie associated with the advertising system can be included in the ad call. The advertising system can use the received cookie to locate information related to user interactions of the user of the resident device related to the webview. As another example, the advertising system can use the received cookie to locate other cookies associated with other browsers of the resident device and associated information for each cookie related to user interactions of the user.

The information is used to determine content for delivery responsive to the request (412). The advertising system can use the located cookies and the associated interaction information to determine relevant content for inclusion in the ad slot responsive to the ad call. When the URL includes contextual information, the contextual information can be used to select content to serve responsive to the received request.

Contextual information can be analyzed for a user across multiple applications and future content selection can be based on the analysis. For example, information stored for a user can indicate that the user has used a first application (e.g., a travel-related application) and a second application (e.g., a sports-related application) on the user device of the user. A subsequent request for content received from the user device can be served based on the analysis of the user's use of the multiple applications on the user device (e.g., a content item related to both sports and travel can be selected).

Contextual information across users can be analyzed and future content selection can be based on the analysis. For example, when an application identifier is passed for a particular application, user interaction information related to that application associated with multiple users can be stored and analyzed. Subsequent content selection for a request for content associated with the application can be based on the information analyzed for the multiple users, in addition to or as an alternative to analyzing information associated with the user associated with the request.

In some implementations, in response to a request for content, a content item is provided which includes a tracking pixel or script. When the content item is rendered in the webview, the tracking pixel or script calls back to the advertising system for the advertising system to drop a cookie associated with the advertising system into a cookie space associated with the webview. The cookie can be included in and used for selecting content for subsequent requests for content received by the advertising system.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. The computer-readable medium is not a propagating signal. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is illustrative only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method for expanding a cookie space of a webview comprising:
    obtaining, by a content management system and from a first webview of a first application that is executing a script at a resident device, a URL that includes a unique identifier of the resident device;
    responsive to receipt of the unique identifier by the content management system:
        dropping, by the content management system, a cookie in a first temporary cookie space of the first webview; and
        storing, in a repository of the content management system, an entry that links the cookie and the unique identifier;
    after the first temporary cookie space of the first webview has been cleared at the resident device, receiving, by the content management system and from a second different webview generated by the resident device, the unique identifier of the resident device;
    retrieving, by the content management system, the cookie from the entry using the unique identifier of the resident device that is received from the second different webview;
    dropping, by the content management system, the retrieved cookie in a second temporary cookie space of the second different webview;
    selecting, by the content management system and in response to the request, a content item for presentation in a publisher page presented by the second different webview using interaction information that (i) was received from the first webview and (ii) was stored in the entry that links the cookie and the unique identifier based on the the retrieved cookie being included in a content request; and
    providing the selected content item to the second different webview at the resident device.

2. The method of claim 1, wherein the script is configured to make a first call to the content management system, the first call including the unique identifier and an address for a domain of the content management system, and responsive to the first call, receive the cookie from the content management system for inclusion in the first temporary cookie space of the first webview.

3. The method of claim 2, wherein responsive to receipt of the first call, the content management system is configured to provide a response, the method further comprising persisting the cookie across multiple different webviews each having temporary cookie spaces that are cleared upon closure of the webview.

4. The method of claim 3, wherein the response includes a tracking pixel.

5. The method of claim 3, wherein the response is an empty response which includes no renderable content.

6. The method of claim 1, wherein the script initiates a call to an operating system of the resident device to retrieve the unique identifier for the device.

7. The method of claim 1, wherein the unique identifier is one of a serial number, IMEI, MEID, ICCID, device identifier, IDFA, or content management system identifier.

8. The method of claim 1, wherein the URL includes contextual information including one or more of an application identifier, information related to the first webview, or location information for the resident device.

9. The method of claim 8, further comprising using the contextual information to select the content item to serve responsive to the received request.

10. The method of claim 1, further comprising generating the cookie including generating a pseudo random cookie, and storing the generated pseudo random cookie indexed by the unique identifier.

11. The method of claim 1, wherein the script is provided to the first application that includes the first webview.

12. A non-transitory computer-readable storage device storing instructions that, when executed by a processor, cause the processor to:
    obtain, from a first webview of a first application that is executing a script at a resident device, a URL that includes a unique identifier of the resident device;
    responsive to receipt of the unique identifier by the content management system:
        drop a cookie in a first temporary cookie space of the first webview; and
        store, in a repository of the content management system, an entry that links the cookie and the unique identifier;
    after the first temporary cookie space of the first webview has been cleared at the resident device, receiving, by the content management system and from a second different webview generated by the resident device, the unique identifier of the resident device;
    retrieve the cookie from the entry using the unique identifier of the resident device that is received from the second different webview;
    drop the retrieved cookie in a second temporary cookie space of the second different webview;
    select, in response to the request, a content item for presentation in a publisher page presented by the second different webview using interaction information that (i) was received from the first webview and (ii) was stored in the entry that links the cookie and the unique identifier based on the the retrieved cookie being included in a content request; and
    provide the selected content item to the second different webview at the resident device.

13. The non-transitory computer-readable storage device of claim 12, wherein:
    the script is configured to make a first call to the content management system, the first call including the unique identifier and an address for a domain of the content management system, and responsive to the first call, receive the cookie from the content management system for inclusion in the first temporary cookie space of the first webview; and the instructions cause the processor to persist the cookie across multiple different webviews each having temporary cookie spaces that are cleared upon closure of the webview.

14. The non-transitory computer-readable storage device of claim 12, wherein the script is configured to make a second, different call after receipt of the cookie of the content management system, the second call to a first publisher website to retrieve content from the first publisher web site for inclusion in the first webview.

15. A system comprising:
one or more processors; and
one or more memory elements including instructions that when executed cause the one or more processors to:
  obtain, from a first webview of a first application that is executing a script at a resident device, a URL that includes a unique identifier of the resident device;
responsive to receipt of the unique identifier by the content management system:
  drop a cookie in a first temporary cookie space of the first webview; and
  store, in a repository of the content management system, an entry that links the cookie and the unique identifier;
  after the first temporary cookie space of the first webview has been cleared at the resident device, receiving, by the content management system and from a second different webview generated by the resident device, the unique identifier of the resident device;
  retrieve the cookie from the entry using the unique identifier of the resident device that is received from the second different webview;
  drop the retrieved cookie in a second temporary cookie space of the second different webview;
  select, in response to the request, a content item for presentation in a publisher page presented by the second different webview using interaction information that (i) was received from the first webview and (ii) was stored in the entry that links the cookie and the unique identifier based on the the retrieved cookie being included in a content request; and
  provide the selected content item to the second different webview at the resident device.

16. The system of claim 15, wherein:
the script is configured to make a first call to the content management system, the first call including the unique identifier and an address for a domain of the content management system, and responsive to the first call, receive the cookie from the content management system for inclusion in the first temporary cookie space of the first webview; and
the instructions cause the one or more processors to persist the cookie across multiple different webviews each having temporary cookie spaces that are cleared upon closure of the webview.

17. The system of claim 16, wherein responsive to receipt of the first call, the content management system is configured to provide a response, the method further comprising persisting the cookie across multiple different webviews each having temporary cookie spaces that are cleared upon closure of the webview.

18. The system of claim 17, wherein the response includes a tracking pixel.

19. The system of claim 17, wherein the response is an empty response which includes no renderable content.

20. The system of claim 15, wherein the script initiates a call to an operating system of the resident device to retrieve the unique identifier for the device.

* * * * *